US012656131B2

(12) United States Patent
Jang et al.

(10) Patent No.: US 12,656,131 B2
(45) Date of Patent: Jun. 16, 2026

(54) SYSTEM AND METHOD FOR COMPUTING OPTIMAL PATH BASED ON LOOP VARIABLES WITH POST-PROCESSING APPLIED

(71) Applicant: Korea Advanced Institute of Science and Technology, Yuseong-gu (KR)

(72) Inventors: In Gwun Jang, Yuseong-Gu (KR); Geunu Kim, Yuseong-Gu (KR); Jeonghun Kim, Yuseong-Gu (KR); Kitae Jang, Yuseong-Gu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 159 days.

(21) Appl. No.: 18/775,172

(22) Filed: Jul. 17, 2024

(65) Prior Publication Data

US 2025/0155249 A1 May 15, 2025

(30) Foreign Application Priority Data

Nov. 15, 2023 (KR) ........................ 10-2023-0157983

(51) Int. Cl.
*G06F 17/11* (2006.01)
*G01C 21/34* (2006.01)

(52) U.S. Cl.
CPC ................................ *G01C 21/3446* (2013.01)

(58) Field of Classification Search
None
See application file for complete search history.

(56) References Cited

U.S. PATENT DOCUMENTS

2022/0082388 A1 3/2022 Lucas et al.
2024/0095036 A1* 3/2024 Neumann ............ G06Q 10/047

FOREIGN PATENT DOCUMENTS

| JP | 3662097 B2 | 6/2005 |
| KR | 10-0901013 B1 | 6/2009 |
| KR | 10-1875925 B1 | 7/2018 |

* cited by examiner

*Primary Examiner* — Cai Y Chen
(74) *Attorney, Agent, or Firm* — Wolf, Greenfield & Sacks, P.C.

(57) ABSTRACT

A system for computing an optimal path includes an arithmetic unit. The arithmetic unit is configured to compute an objective moving path from one of a plurality of nodes to another one of the plurality of nodes. Each of a plurality of link variables corresponds to a path connecting any two adjacent nodes of the plurality of nodes. Each of the plurality of link variables has a value and a direction. Each of a plurality of loop variables corresponds to a closed path connecting at least any three nodes of the plurality of nodes. Each of the plurality of loop variables has a value and a direction. A reference path variable corresponds to any moving path and has a value and a direction. The arithmetic unit computes the plurality of link variables based on the reference path variable and the plurality of loop variables. The arithmetic unit uses the plurality link variables to compute a plurality of objective function values corresponding, respectively, to a plurality of moving paths. The arithmetic unit computes a moving path corresponding to a minimum objective function value, which is the smallest value among the plurality of objective function values, as the objective moving path.

20 Claims, 12 Drawing Sheets

*FIG.9*

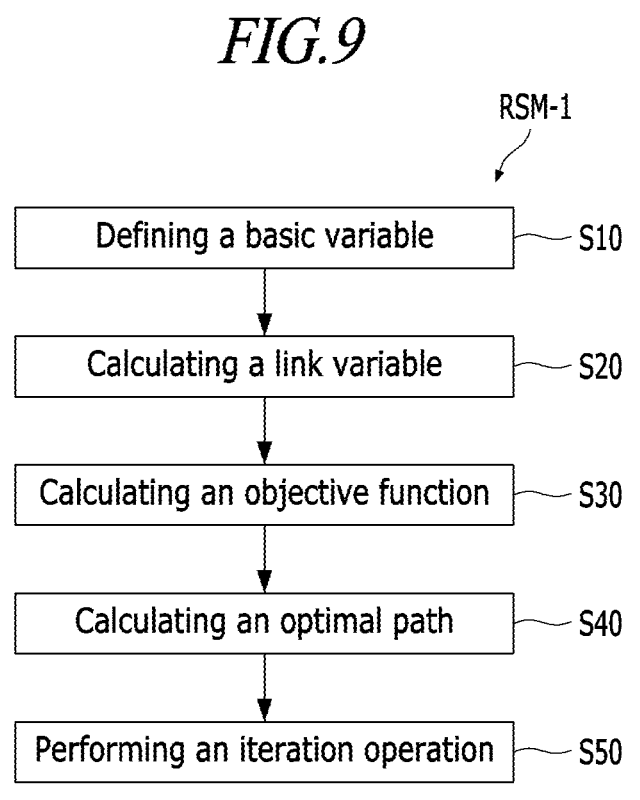

RSM-1

| | |
|---|---|
| Defining a basic variable | — S10 |
| Calculating a link variable | — S20 |
| Calculating an objective function | — S30 |
| Calculating an optimal path | — S40 |
| Performing an iteration operation | — S50 |

FIG.11

| Optimal Path 1 (Min. Moving Distance) | |
|---|---|
| Total Moving Distance (km) | 38.23 |
| Total Energy Consumption (kWh) | 17.07 |

(a)

| Optimal Path 2 (Min. Energy Consumption) | |
|---|---|
| Total Moving Distance (km) | 41.46 |
| Total Energy Consumption (kWh) | 15.28 |

(b)

SYSTEM AND METHOD FOR COMPUTING OPTIMAL PATH BASED ON LOOP VARIABLES WITH POST-PROCESSING APPLIED

CROSS-REFERENCE TO RELATED APPLICATION

The present application claims priority from Korean Patent Application No. 10-2023-0157983, filed on Nov. 15, 2023, in the Korean Intellectual Property Office, the disclosure of which is incorporated herein in its entirety by reference.

BACKGROUND

1. Field

The present disclosure relates to a system and method for computing an optimal path based on loop variables, and more specifically to a system and method for computing multiple paths by minimizing the computational load of the iteration process and applying a plurality of different thresholds.

2. Description of Related Art

The issue of route optimization for finding an optimal path from one of multiple nodes to another has been studied in various fields, including transportation engineering, mechanical engineering and industrial engineering. Moreover, there is a demand for the development of technology that computes multiple optimal paths by considering complex factors such as time, distance, energy consumption, etc., beyond simply finding the shortest path.

Various techniques have been proposed to address the above-described route optimization issue. However, the existing techniques have limitations in that they can only handle linear functions, require a large number of variables to represent the path, or require multiple constraints to ensure the connectivity of the path.

Thus, the present applicant has proposed a novel method for representing a path using loop variables. Loop variables refer to variables defined for closed paths connecting a plurality of nodes. By utilizing loop variables, it is possible to represent paths and compute objective function values with fewer variables than when using link variables corresponding to paths connecting two nodes. Moreover, using loop variables ensures path connectivity without requiring additional constraints, thereby enabling relatively easy handling of complex nonlinear functions.

Nonetheless, even when utilizing the method of representing paths using loop variables, improvement is still needed in terms of computational load.

SUMMARY

Contrived to implement the above-described improvements in terms of computational load, an object of the present disclosure is to provide a system and method for saving the computational load and the time required to compute the moving path by appropriately adjusting the number of iterations that optimize the loop variables and for computing a plurality of objective moving paths.

Another object of the present disclosure is to provide a system and method for saving the computational load and the time required to compute the moving path through a post-process that appropriately changes the loop variables based on a specific threshold and for computing a plurality of objective moving paths.

A system for computing an optimal path in accordance with an embodiment of the present disclosure may include an arithmetic unit. The arithmetic unit may be configured to compute an objective moving path from any one to another one of a plurality of nodes. Each of a plurality of link variables may correspond to a path connecting any two adjacent nodes of the plurality of nodes. Each of the plurality of link variables may have a value and a direction. Each of a plurality of loop variables may correspond to a closed path connecting at least any three nodes of the plurality of nodes. Each of the plurality of loop variables may have a value and a direction. A reference path variable may correspond to any moving path. The reference path variable may have a value and a direction. The arithmetic unit may be configured to compute the plurality of link variables based on the reference path variable and the plurality of loop variables. The arithmetic unit may be configured to use the plurality link variables to compute a plurality of objective function values corresponding, respectively, to a plurality of moving paths. The arithmetic unit may be configured to compute a moving path corresponding to a minimum objective function value, which is the smallest value among the plurality of objective function values, as the objective moving path.

In the system for computing an optimal path in accordance with an embodiment of the present disclosure, a first link variable may be one of the plurality of link variables. The first link variable may correspond to a path connecting a first node and a second node of the plurality of nodes. A first loop variable may be one of the plurality of loop variables. A first loop variable may be one of the plurality of loop variables. The first loop variable may correspond to a closed path connecting the first node, the second node and a third node of the plurality of nodes. The arithmetic unit may be configured to compute a value of the first link variable based on a result of comparing a direction of the first link variable with a direction of the first loop variable and with a direction of the reference path variable.

In the system for computing an optimal path in accordance with an embodiment of the present disclosure, the arithmetic unit may be configured to calculate a link variable median by adding the value of the first loop variable to a predetermined value when the direction of the first loop variable is the same as the direction of the first link variable. The arithmetic unit may be configured to calculate the link variable median by subtracting the value of the first loop variable from the predetermined value when the direction of the first loop variable is different from the direction of the first link variable. The arithmetic unit may be configured to calculate the value of the first link variable by adding the value of the reference path variable to the link variable median when the direction of the reference path variable is the same as the direction of the first link variable. The arithmetic unit may be configured to calculate the value of the first link variable by subtracting the value of the reference path variable from the link variable median when the direction of the first loop variable is different from the direction of the first link variable.

In the system for computing an optimal path in accordance with an embodiment of the present disclosure, a plurality of cost variables are defined, each corresponding to a path connecting any two adjacent nodes of the plurality of nodes. The arithmetic unit may be configured to further use the plurality of cost variables to calculate the plurality of objective function values.

In the system for computing an optimal path in accordance with an embodiment of the present disclosure, the arithmetic unit may be configured to compute the plurality of objective function values using Equation 1, which may be $$\text{Minimize } f(X) = \sum_{i=1}\sum_{j=1} c_{i,j} x_{i,j},$$

whereas f(X) may correspond to any one of the plurality of objective function values, and i and j may each correspond to any one of the plurality of nodes, and $c_{i,j}$ may correspond to any one of the plurality of cost variables, and $x_{i,j}$ may correspond to any one of the plurality of link variables.

In the system for computing an optimal path in accordance with an embodiment of the present disclosure, the arithmetic unit may be configured to perform at least one iteration in which at least some of the plurality of loop variables are changed such that the minimum objective function value is reduced.

In the system for computing an optimal path in accordance with an embodiment of the present disclosure, the arithmetic unit may be configured to change at least some of the plurality of loop variables using at least one of SQP (sequential quadratic programming), convex optimization, gradient-based methods, genetic algorithms, simulated annealing, interior-point methods and dynamic programming in the process of performing the iteration.

In the system for computing an optimal path in accordance with an embodiment of the present disclosure, the arithmetic unit may be configured to perform the iteration multiple times. The arithmetic unit may be configured to determine whether to terminate the iteration based on a rate at which the minimum objective function value is reduced through the iteration.

In the system for computing an optimal path in accordance with an embodiment of the present disclosure, the arithmetic unit may be configured to terminate the iteration if the rate at which the minimum objective function value is reduced is less than a predetermined iteration threshold ratio.

In the system for computing an optimal path in accordance with an embodiment of the present disclosure, the arithmetic unit may be configured to determine whether to terminate the iteration based on a value by which the minimum objective function value is reduced through the iteration.

In the system for computing an optimal path in accordance with an embodiment of the present disclosure, the arithmetic unit may be configured to perform the iteration for a predetermined number of iterations.

In the system for computing an optimal path in accordance with an embodiment of the present disclosure, the arithmetic unit may be configured to calculate a plurality of post-processing loop variables by changing, among the plurality of loop variables changed through the iteration, a value of a loop variable smaller than a post-processing threshold to 0. The arithmetic unit may be configured to compute a plurality of objective moving paths using the plurality of post-processing loop variables.

In the system for computing an optimal path in accordance with an embodiment of the present disclosure, the arithmetic unit may be configured to calculate a plurality of post-processing loop variables by changing, among the plurality of loop variables changed through the iteration, the value of a loop variable smaller than the post-processing threshold to 0 and changing a value of a loop variable greater than or equal to the post-processing threshold to the value of the reference path variable. The arithmetic unit may be configured to compute a plurality of objective moving paths using the plurality of post-processing loop variables.

In the system for computing an optimal path in accordance with an embodiment of the present disclosure, the arithmetic unit may be configured to calculate a plurality of post-processing loop variables and a plurality of objective moving paths corresponding, respectively, to a plurality of post-processing thresholds.

In a method for computing an optimal path in accordance with an embodiment of the present disclosure, an arithmetic unit may be used. The arithmetic unit may be configured to compute an objective moving path from one of a plurality of nodes to another. The method may include defining a basic variable, calculating a link variable, calculating an objective function and calculating an optimal path. In the step of defining a basic variable, the arithmetic unit may define a plurality of link variables, each corresponding to a path connecting any two adjacent nodes of the plurality of nodes and having a value and a direction. Moreover, the arithmetic unit may define a plurality of loop variables, each corresponding to a closed path connecting any three nodes of the plurality of nodes and having a value and a direction. Furthermore, the arithmetic unit may define a reference path variable corresponding to any moving path and having a value and a direction. In the step of calculating a link variable, the arithmetic unit may calculate a plurality of link variables based on the reference link variable and the plurality of loop variables. In the step of calculating an objective function, the arithmetic unit may calculate a plurality of objective function values, each corresponding to a plurality of moving paths, using the plurality of link variables. In the step of calculating an optimal path, the arithmetic unit may calculate a moving path corresponding to a minimum objective function value, which is the smallest value among the plurality of objective function values, as the objective moving path.

In the method for computing an optimal path in accordance with an embodiment of the present disclosure, the step of calculating the link variable may include calculating a first link variable and calculating a second link variable. In the step of calculating the first link variable, the arithmetic unit may calculate a link variable median by adding a value of a first loop variable to a predetermined value when a direction of the first loop variable is the same as a direction of the first link variable and calculate the link variable median by subtracting the value of the first loop variable from the predetermined value when the direction of the first loop variable is different from the direction of the first link variable. In the step of calculating the second link variable, the arithmetic unit may calculate a value of the first link variable by adding the value of the reference path variable to the link variable median when the direction of the reference path variable is the same as the direction of the first link variable and calculate the value of the first link variable by subtracting the value of the reference path variable from the link variable median when the direction of the first loop variable is different from the direction of the first link variable.

In the step of calculating the objective function of the method for computing an optimal path in accordance with an embodiment of the present disclosure, the arithmetic unit may define a plurality of cost variables, each corresponding to a path connecting any two adjacent nodes of the plurality of nodes. Moreover, the arithmetic unit may further use the plurality of cost variables to calculate the plurality of objective function values.

In the step of calculating the objective function of the method for computing an optimal path in accordance with an embodiment of the present disclosure, the arithmetic unit may compute the plurality of objective function values using Equation 1, which may be $$\text{Minimize } f(X) = \sum_{i=1}\sum_{j=1} c_{i,j} x_{i,j},$$

whereas f(X) may correspond to any one of the plurality of objective function values, and i and j may each correspond to any one of the plurality of nodes, and $c_{i,j}$ may correspond to any one of the plurality of cost variables, and $x_{i,j}$ may correspond to any one of the plurality of link variables.

The method for computing an optimal path in accordance with an embodiment of the present disclosure may further include performing an iteration operation. In the step of performing the iteration operation, the arithmetic unit may perform at least one iteration in which at least some of the plurality of loop variables are changed such that the minimum objective function value is reduced.

In the step of performing the iteration operation of the method for computing an optimal path in accordance with an embodiment of the present disclosure, the arithmetic unit may determine whether to terminate the iteration based on a rate at which the minimum objective function value is reduced through the iteration or based on a value by which the minimum objective function value is reduced through the iteration.

The method for computing an optimal path in accordance with an embodiment of the present disclosure may further include performing a post-process. The arithmetic unit may compute a plurality of post-processing loop variables by changing, among the plurality of loop variables changed through the iteration, a value of a loop variable smaller than the post-processing threshold to 0.

The method for computing an optimal path in accordance with an embodiment of the present disclosure may further include performing a post-process. The arithmetic unit may compute a plurality of post-processing loop variables by changing, among the plurality of loop variables changed through the iteration, a value of a loop variable smaller than the post-processing threshold to 0 and changing a value of a loop variable greater than or equal to the post-processing threshold to the value of the reference path variable.

In accordance with an embodiment of the present disclosure, it is possible to provide a system and method for saving the computational load and the time required to compute the moving path by appropriately adjusting the number of iterations that optimize the loop variables and for computing a plurality of moving paths.

In accordance with an embodiment of the present disclosure, it is possible to provide a system and method for saving the computational load and the time required to compute the moving path through a post-process that appropriately changes the loop variables based on a specific threshold and for computing a plurality of moving paths.

BRIEF DESCRIPTION OF THE DRAWINGS

FIG. 9 is a flow diagram for a method for computing an optimal path in accordance with another embodiment of the present disclosure.

FIG. 11 illustrates an objective moving path computed from point 1 to point 2 through the system or method for computing an optimal path in accordance with an embodiment of the present invention.

DETAILED DESCRIPTION

Figure 1:
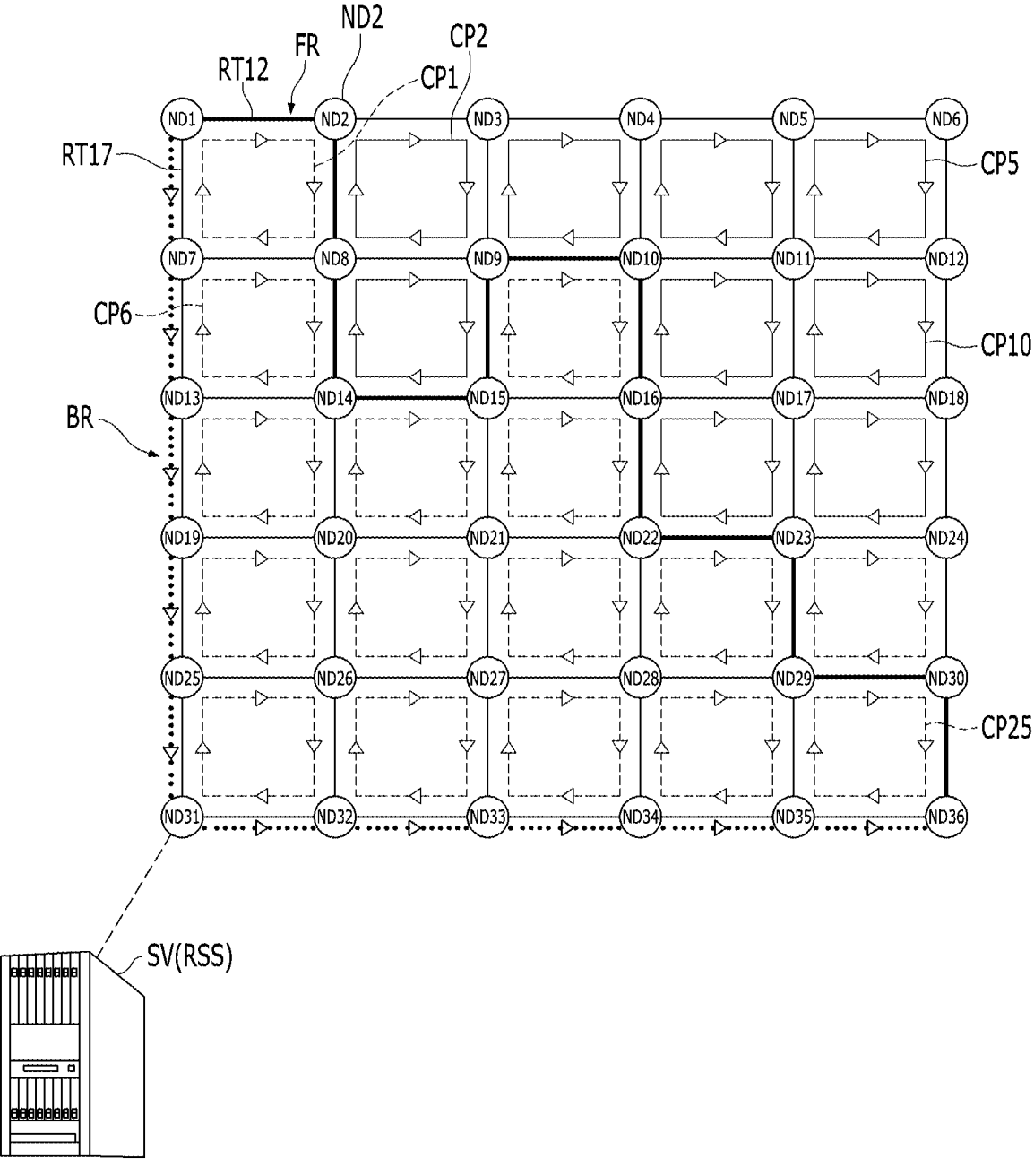
FIG. 1 illustrates how an objective moving path is calculated by a system for computing an optimal path in accordance with an embodiment of the present disclosure.

Hereinafter, certain preferred embodiments of the present disclosure will be described with reference to the accompanied drawings. In the drawings, the proportions and dimensions of the elements may be exaggerated for effective description of the technical details.

Throughout the description, it shall be appreciated that terms such as "comprise," "comprising," "include" and "including" are intended to specify that there are certain features, numbers, steps, actions, elements, components, or any combination thereof described in the specification and not to exclude the possibility of presence or addition of one or more of other features, numbers, steps, actions, elements, components or any combination thereof.

Moreover, when a certain element is described to be "on" another element, it shall be appreciated that the particular element is above or below the other element and not necessarily located on an upper side of the other element in the gravitational direction.

Moreover, when an element is described to be "connected" or "coupled" to another element, it shall be appreciated that the particular element may not only be directly connected or coupled to the other element but also be indirectly connected or coupled to the other element by way of yet another element.

Moreover, while terms such as "first," "second," etc. may be used in describing an element, it shall be appreciated that these terms are used merely for distinguishing one element from other elements and not for defining the nature, order or sequence of the element.

FIG. 1 illustrates how an objective moving path FR is calculated by a system RSS for computing an optimal path in accordance with an embodiment of the present disclosure.

The system RSS for computing an optimal path in accordance with an embodiment of the present disclosure may include an arithmetic unit SV. Referring to FIG. 1, the arithmetic unit SV may be configured to calculate the objective moving path FR from one node ND1 to another node ND36 of a plurality of nodes.

Each of a plurality of link variables may correspond to a path connecting any two adjacent nodes of the plurality of nodes ND1-ND36. Each of the plurality of link variables may have a value and a direction. For example, in FIG. 1, the link variable representing a relationship between a first node ND1 and a second node ND2 may correspond to a path RT12 connecting the first node ND1 with the second node ND2. The direction of the link variable representing the relationship between the first node ND1 and the second node ND2 may be either a direction towards the second node ND2 from the first node ND1 or a direction towards the first node ND1 from the second node ND2.

Each of a plurality of loop variables may correspond to a closed path connecting any three nodes of the plurality of nodes ND1-ND36. Each of the plurality of loop variables may have a value and a direction. The direction of each of the plurality of loop variables may be clockwise or counterclockwise.

In an embodiment of the present disclosure, each of the plurality of loop variables may correspond to a closed path connecting any four nodes of the plurality of nodes ND1-ND36. For example, in FIG. 1, the loop variable representing a relationship between the first node ND1, the second node ND2, a seventh node ND7 and an eighth node ND8 may correspond to a closed path CP1 connecting the first node ND1, the second node ND2, the seventh node ND7 and the eighth node ND8. The direction of the loop variable representing the relationship between the first node ND1, the second node ND2, the seventh node ND7 and the eighth node ND8 may be clockwise or counterclockwise.

A reference path variable may correspond to an arbitrary moving path BR. The reference path variable may have a value and a direction. For example, in FIG. 1, the arbitrary moving path BR corresponding to the reference path variable may be a path that sequentially passes through the first node ND1, the seventh node ND7, a thirteenth node ND13, a nineteenth node ND19, a twenty-fifth node ND25, a thirty-first node ND31, a thirty-second node ND32, a thirty-third node ND33, a thirty-fourth node ND34, a thirty-fifth node ND35 and a thirty-sixth node ND36, and the direction of the reference path variable may be the direction of the arbitrary moving path BR.

The arbitrary moving path BR corresponding to the reference path variable may be utilized as a basis for calculating a more efficient objective moving path in a subsequent iteration process. Specifically, the arithmetic unit SV may be configured to vary at least some of the plurality of loop variables in order to calculate an objective moving path in which a minimum objective function value is further reduced based on the arbitrary moving path BR. Accordingly, a new objective moving path may be computed. This will be described in detail with reference to FIG. 5.

In an embodiment of the present disclosure, the reference path variable may include a direction and a value corresponding to each of a plurality of paths connecting any two adjacent nodes among the plurality of nodes ND1-ND36. The value of the reference path variable may be a constant. However, the value of the reference path variable of the present disclosure is not limited to this and may be varied as required by the user.

The arithmetic unit SV may be configured to calculate the plurality of link variables based on the reference path variable and the plurality of loop variables. The arithmetic unit SV may be configured to calculate a plurality of objective function values corresponding, respectively, to a plurality of moving paths using the plurality of link variables. The arithmetic unit SV may be configured to calculate a moving path corresponding to the minimum objective function value, which is the smallest value among the plurality of objective function values, as the objective moving path. For instance, in FIG. 1, the objective moving path FR may correspond to a path that sequentially passes through the first node ND1, the second node ND2, an eighth node ND3, a fourteenth node ND14, a fifteenth node ND15, a ninth node ND9, a tenth node ND10, a sixteenth node ND16, a twenty-second node ND22, a twenty-third node ND23, a twenty-ninth node ND28, a thirtieth node ND30 and the thirty-sixth node ND36.

Figure 2A:
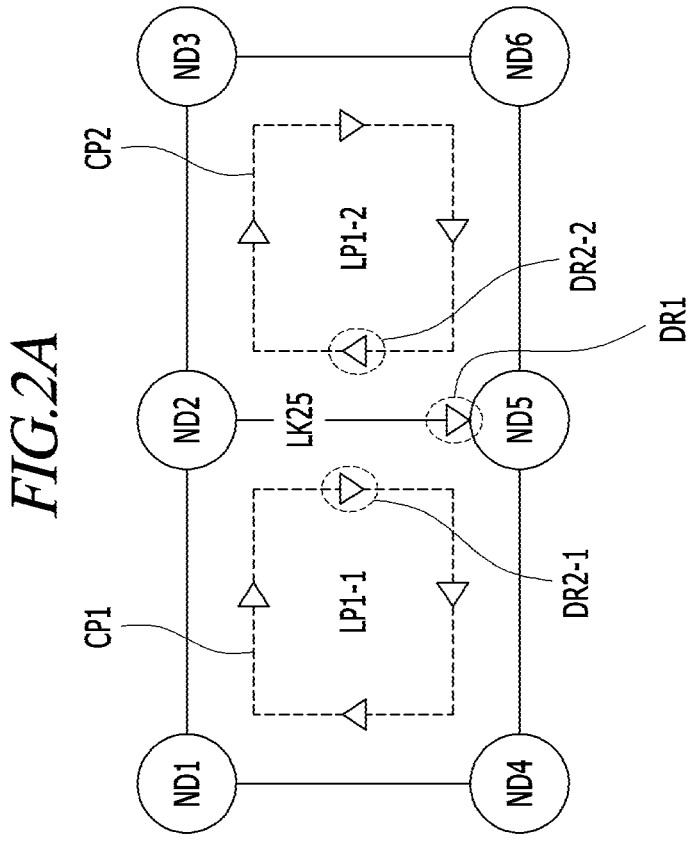
FIG. 2A and FIG. 2B illustrate how a value of a link variable is calculated.
Figure 2B:
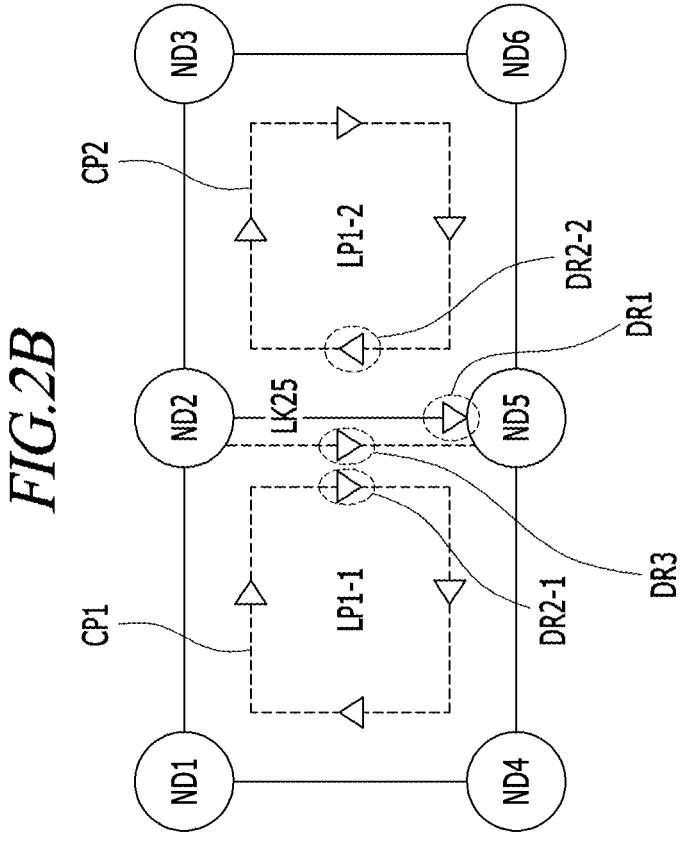

FIG. 2A and FIG. 2B illustrate how a value of a link variable is calculated.

In FIGS. 2A and 2B, a first loop variable may be a loop variable LP1-1 corresponding to a first closed path CP1 or a loop variable LP1-2 corresponding to a second closed path CP2. The first closed path CP1 may be the closed path connecting the first node ND1, the second node ND2, a fourth node ND4 and a fifth node ND5. The second closed path CP2 may be the closed path connecting the second node, a third node ND3, the fifth node ND5 and a sixth node ND6. A first link variable LK25 may be one of the plurality of link variables. For example, the first link variable LK25 may correspond to a path RT25 connecting the second node ND2 and the fifth node ND5.

The arithmetic unit SV may be configured to calculate the value of a link variable corresponding to any two nodes of the plurality of nodes based on the reference path variable and loop variable corresponding to the two nodes. Specifically, the arithmetic unit SV may be configured to calculate the value of the first link variable LK25 based on the comparison of the direction of the first link variable DR1 with the direction of the of the first loop variable DR2-1 or DR2-2 and the direction of the reference path variable DR3.

Referring to FIG. 2A, in an embodiment of the present disclosure, when the direction of the of the first loop variable DR2-1 or DR2-2 is the same as the direction of the first link variable DR1, the arithmetic unit SV may be configured to calculate a link variable median by adding the value of the first loop variable to a predetermined value. When the direction of the of the first loop variable DR2-1 or DR2-2 is different from the direction of the first link variable DR1, the arithmetic unit SV may be configured to calculate the link variable median by subtracting the value of the first loop variable from the predetermined value.

Referring to FIG. 2B, when the direction of the reference path variable DR3 is the same as the direction of the first link variable DR2-1 or DR2-2, the arithmetic unit SV may be configured to calculate the value of the first link variable by adding the value of the reference path variable to the link variable median. When the direction of the first loop variable DR2-1 or DR2-2 is different from the direction of the first link variable DR1, the arithmetic unit SV may be configured to calculate the value of the first link variable by subtracting the value of the reference path variable from the link variable median. In the present embodiment, the predetermined value may be varied as required by the user.

In an embodiment of the present disclosure, a plurality of cost variables are defined, wherein each of the plurality of cost variables corresponds to a path connecting any two adjacent nodes of the plurality of nodes. The arithmetic unit SV may be configured to further use the plurality of cost variables to calculate the plurality of objective function values.

In an embodiment of the present disclosure, a cost variable may refer to a cost occurring when moving in a path connecting any two adjacent nodes of the plurality of nodes. For instance, the cost variable may correspond to at least one of a moving distance, a moving time and energy consumption.

The moving distance may refer to a physical distance of the path connecting any two adjacent nodes of the plurality of nodes. The moving time may refer to a time taken to move in the path connecting any two adjacent nodes of the plurality of nodes. The energy consumption may refer to energy consumed to move in the path connecting any two adjacent nodes of the plurality of nodes.

Nonetheless, the cost variable of the present disclosure is not limited to what is described herein and may be any variable referring to a cost incurred when moving in a path. Moreover, the cost variable may be varied as required by the user.

In the system RSS for computing an optimal path in accordance with an embodiment of the present disclosure, the arithmetic unit SV may be configured to compute the plurality of objective function values using Equation 1, which may be $$\text{Minimize } f(X) = \sum_{i=1}^{} \sum_{j=1}^{} c_{i,j} x_{i,j},$$

whereas f(X) may correspond to any one of the plurality of objective function values, and i and j may each correspond to any one of the plurality of nodes, and $c_{i,j}$ may be a cost variable corresponding to a path from a node corresponding to i to a node corresponding to j of the plurality of cost variables, and $x_{i,j}$ may correspond to the path from the node corresponding to i to the node corresponding to j of the plurality of link variables. The node corresponding to i and the node corresponding to j may be adjacent to each other.

Figure 3:
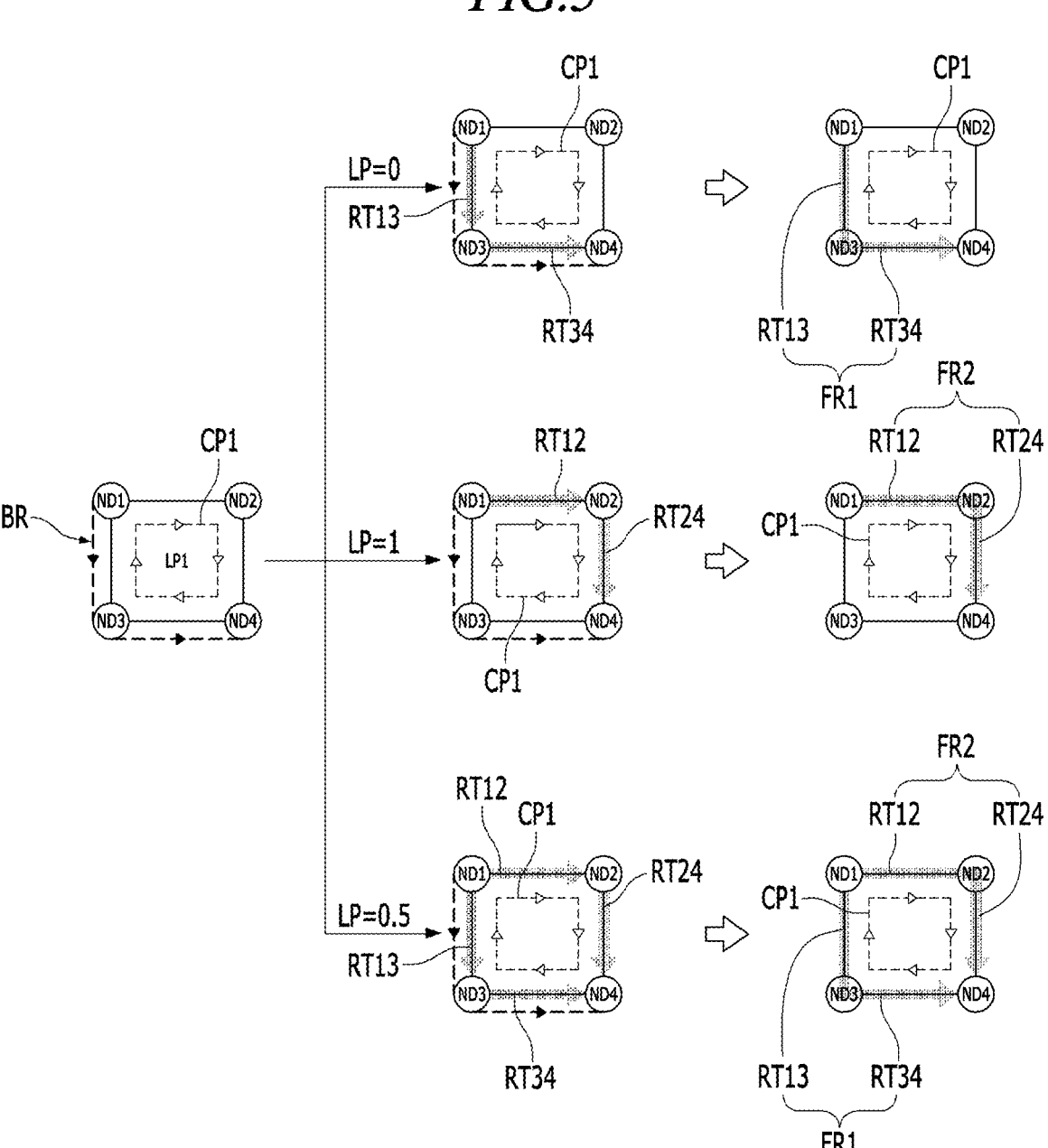
FIG. 3 illustrates how the objective moving path is calculated based on a loop variable and a reference path variable.

FIG. 3 illustrates how the objective moving path is calculated based on the loop variable and the reference path variable.

In FIG. 3, the arbitrary moving path BR corresponding to the reference path variable may be a moving path that sequentially passes through the first node ND1, the third node ND3 and the fourth node ND4. A first loop variable LP1 may be a loop variable corresponding to a closed path CP1 connecting the first node, the second node, the third node and the fourth node. The direction of the first loop variable LP1 may be clockwise.

Referring to FIG. 3, the arithmetic unit SV in accordance with an embodiment of the present disclosure may be configured to compute the objective moving path based on the loop variable and the reference path variable. Specifically, the arithmetic unit SV may be configured to calculate the plurality of link variables based on the reference path variable and the loop variable and to calculate the objective moving path based on the calculated plurality of link variables. The arithmetic unit SV may be configured to calculate the objective moving path based on paths excluding the plurality of paths of which the respectively corresponding link variables have the value of 0.

For the convenience of description, it is assumed in FIG. 3 that the reference path variable has a positive value and that the predetermined value is 0. Hereinafter, it will be described how the objective moving path is differently computed based on the value of the first loop variable LPL.

Referring to FIG. 3, an objective moving path FR1 is computed as follows when the value of the first loop variable LP1 is 0. The link variable median corresponding to a path RT13 moving from the first node towards the third node may be calculated to be 0 by adding the value of the first loop variable LP1 to the predetermined value, which is 0. The value of the link variable LK13 corresponding to the path RT13 moving from the first node towards the third node may be calculated by adding a positive value, which is a value of the reference path variable corresponding to the path RT13 moving from the first node towards the third node, to the link variable median, which is 0. Therefore, the link variable LK13 corresponding to the path RT13 moving from the first node towards the third node may have a positive value. Similarly, a link variable LK34 corresponding to a path RT34 moving from the third node towards the fourth node may have a positive value. The link variable median corresponding to the path RT12 moving from the first node towards the second node may be calculated to be 0 by adding the value of the first loop variable LP1 to the predetermined value, which is 0. The value of the link variable LK12 corresponding to the path RT12 moving from the first node towards the second node may be calculated by adding 0, which is the value of the reference path variable corresponding to the path RT12 moving from the first node towards the second node, to the link variable median, which is 0. Therefore, a link variable LK12 corresponding to the path RT12 moving from the first node towards the second node may have the value of 0. Similarly, the link variable LK34 corresponding to the path RT34 moving from the third node towards the fourth node may have the value of 0. Accordingly, the arithmetic unit SV may be configured to compute the objective moving path FR1 with the moving path sequentially passing through the first node ND1, the third node ND3 and the fourth node ND4, excluding the paths of which the link variable has the value of 0.

Referring to FIG. 3, an objective moving path FR2 is computed as follows when the value of the first loop variable LP1 is 1. Through the process described above, the link variable LK12 corresponding to the path RT12 moving from the first node towards the second node and the link variable LK24 corresponding to the path RT24 moving from the second node to the fourth node may each have a positive value. On the other hand, the value of the link variable LK13 corresponding to the path RT13 moving from the first node towards the third node and the value of the link variable LK34 corresponding to the path RT34 moving from the third node towards the fourth node may each be 0. Accordingly, the arithmetic unit SV may be configured to compute the objective moving path FR2 with the moving path sequentially passing through the first node ND1, the second node ND2 and the fourth node ND4.

Referring to FIG. 3, the plurality of objective moving paths FR1, FR2 are computed as follows when the value of the first loop variable LP1 is 0.5 When the value of the first loop variable LP1 is 0.5, through the process described above for the case when the value of the first loop variable LP1 is 1, the link variable LK12 corresponding to the path RT12 moving from the first node towards the second node, the link variable LK24 corresponding to the path RT24 moving from the second node towards the fourth node, the link variable LK13 corresponding to the path RT13 moving from the first node towards the third node and the link variable LK34 corresponding to the path RT34 moving from the third node towards the fourth node may each have a positive value. Accordingly, the arithmetic unit SV may be configured to compute the first objective moving path FR1 with the moving path sequentially passing through the first node ND1, the third node ND3 and the fourth node ND4. Moreover, the arithmetic unit SV may be configured to compute the second objective moving path FR2 with the moving path sequentially passing through the first node ND1, the second node ND2 and the fourth node ND4. In other words, the arithmetic unit SV may be configured to compute a plurality of objective moving paths FR1, FR2 based on the first loop variable LP1 and the reference moving path.

Figure 4:
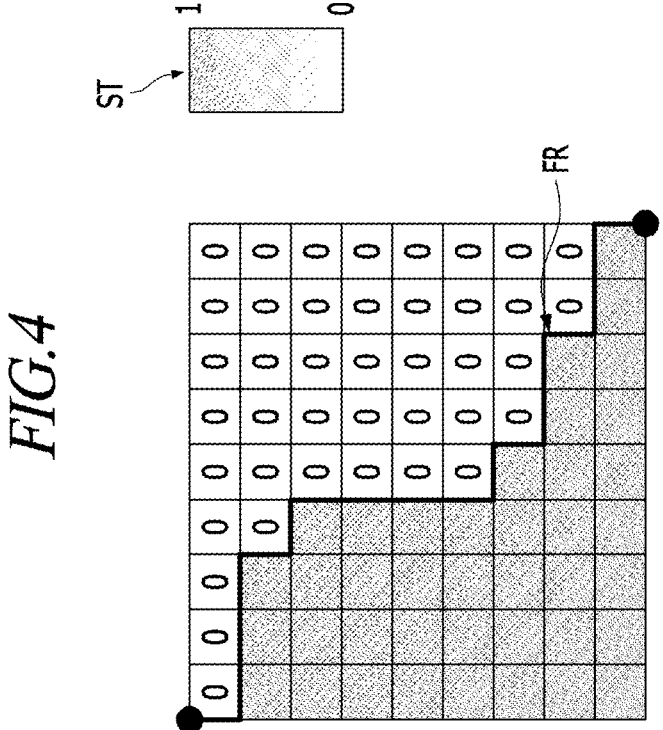
FIG. 4 illustrates how the arithmetic unit calculates the objective moving path when the iteration is sufficiently performed.

FIG. 4 illustrates how the arithmetic unit SV calculates the objective moving path FR when the iteration is sufficiently performed. In FIG. 4, the shade ST of an area corresponding to a loop variable may correspond to the value of said loop variable. For instance, as the value of a loop variable is closer to 1, the area corresponding to the loop variable may have a darker shade. It should be appreciated however that the shades are merely introduced to visually illustrate the process of calculating the objective moving path FR and that the present disclosure is not limited thereto.

Referring to FIG. 4, the arithmetic unit SV of the system RSS for computing an optimal path in accordance with an embodiment of the present disclosure may be configured to perform at least one iteration in which at least some of the plurality of loop variables are changed such that the minimum objective function value is reduced. That is, the arithmetic unit SV may be configured to vary at least some of the plurality of loop variables such that the minimum objective function value is reduced by performing the iteration, and to compute the objective moving path FR by using the varied plurality of loop variables.

In the system RSS for computing an optimal path in accordance with an embodiment of the present disclosure, the arithmetic unit SV may be configured to vary at least some of the plurality of loop variables by using at least one of SQP (sequential quadratic programming), convex optimization, gradient-based methods, genetic algorithms, simulated annealing, interior-point methods and dynamic programming in the course of performing the iteration. It shall be appreciated however that the present disclosure is not limited to these examples and that any other algorithms capable of locating a plurality of loop variables that reduce the minimum objective function value may be used in the course of performing the iteration.

Referring to FIG. 4, after the iteration is sufficiently performed, the plurality of loop variables are grouped into a first area, in which the value of the loop variable is 0, and a second area, in which the value of the loop variable is not 0. Accordingly, the arithmetic unit SV may yield a moving path corresponding to a boundary between the first area and the second area as the objective moving path FR.

Figure 5:
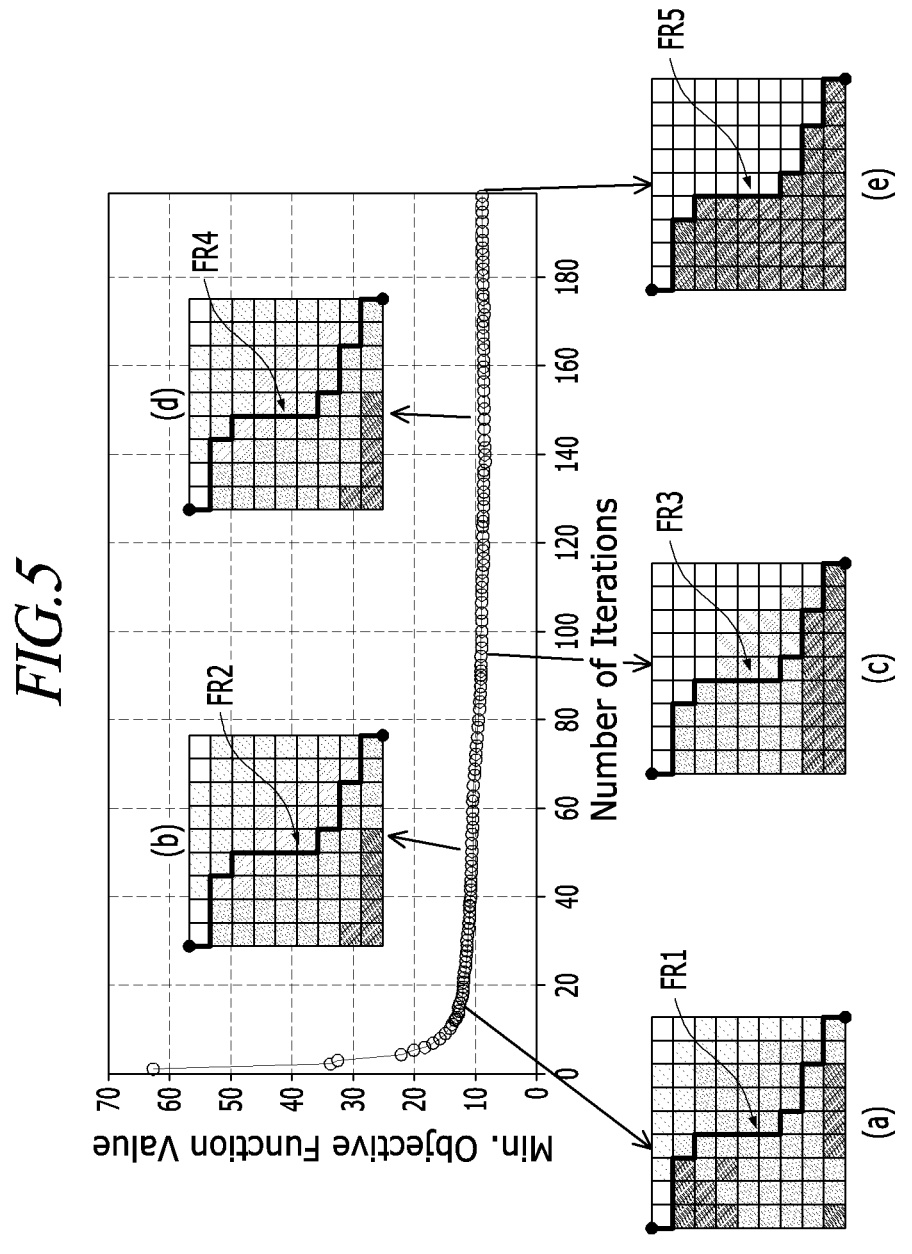
FIG. 5 illustrates the variation in minimum objective function value based on the number of iterations.

FIG. 5 illustrates the variation in minimum objective function value based on the number of iterations.

In FIG. 5, the shade of an area corresponding to a loop variable may correspond to the value of the loop variable. In the present description, the number of iterations may refer to the number of iterations performed by the arithmetic unit SV to reduce the minimum objective function value by varying at least some of the plurality of loop variables.

In FIG. 5, the figure depicted with (a) shows the shades of a plurality of areas corresponding, respectively, to the plurality of loop variables and the objective moving path FR1 when the iteration is performed 10 times. The figure depicted with (b) shows the shades of the plurality of areas corresponding, respectively, to the plurality of loop variables and the objective moving path FR2 when the iteration is performed 50 times. The figure depicted with (c) shows the shades of the plurality of areas corresponding, respectively, to the plurality of loop variables and the objective moving path FR3 when the iteration is performed 100 times. The figure depicted with (d) shows the shades of the plurality of areas corresponding, respectively, to the plurality of loop variables and the objective moving path FR4 when the iteration is performed 150 times. The figure depicted with (e) shows the shades of the plurality of areas corresponding, respectively, to the plurality of loop variables and the objective moving path FR5 when the iteration is performed 199 times.

Referring to (a) to (e) of FIG. 5, it can be seen that the value of the computed loop variable and the yielded objective moving path FR vary according to the number of iterations. The plurality of objective moving paths FR1, FR2, FR3, FR4, FR5 may be calculated based on the number of iterations. Moreover, the greater the number of iterations, the minimum objective function value becomes smaller.

That is, with the greater number of iterations performed, the objective moving path FR having a smaller minimum objective function value may be yielded. This may mean that with the greater number of iterations performed, the objective moving path that requires a smaller cost for moving is yielded.

However, the greater number of iterations performed causes an increase computational load in the arithmetic unit SV and an increased time required to compute the objective moving path. Therefore, the computational load in the arithmetic unit SV may be reduced, and the objective moving path may be computed faster, by property adjusting the number of iterations. The following will describe specifically on how the arithmetic unit SV adjusts the number of iterations.

Referring to FIG. 5, in an embodiment of the present disclosure, the arithmetic unit SV may be configured to perform the iteration multiple times. The arithmetic unit SV may be configured to determine whether to terminate the iteration based on a rate at which the minimum objective function value is reduced through the iteration.

In the system RSS for computing an optimal path in accordance with an embodiment of the present disclosure, the arithmetic unit SV may be configured to terminate the iteration when the rate at which the minimum objective function value is reduced through the iteration is less than a predetermined iteration threshold ratio. The rate at which the minimum objective function value is reduced through the iteration may mean the efficiency of the arithmetic unit SV in performing the iteration. Therefore, by terminating the iteration when the efficiency of performing the iteration is below the predetermined iteration threshold ratio, it is possible for the arithmetic unit SV to lower the computational load and swiftly compute the objective moving path FR. In an embodiment of the present disclosure, the user may vary the predetermined iteration threshold ratio as necessary.

In the system RSS for computing an optimal path in accordance with an embodiment of the present disclosure, the arithmetic unit SV may be configured to determine whether to terminate the iteration based on a value by which the minimum objective function value is reduced through the iteration. The value by which the minimum objective function value is reduced through the iteration may mean the efficiency of the arithmetic unit SV in performing the iteration. Therefore, in the an embodiment of the present disclosure, by terminating the iteration when the efficiency of performing the iteration is below a predetermined iteration threshold, it is possible for the arithmetic unit SV to lower the computational load and swiftly compute the objective moving path FR. In an embodiment of the present disclosure, the user may vary the predetermined iteration threshold as necessary.

In the system RSS for computing an optimal path in accordance with an embodiment of the present disclosure, the arithmetic unit SV may be configured to perform the iteration for a predetermined number of iterations. In other words, the arithmetic unit SV may be configured to stop performing the iteration after the iteration has been performed for the predetermined number of iterations. In an embodiment of the present disclosure, the user may vary the predetermined number of iterations as necessary.

Figure 6:
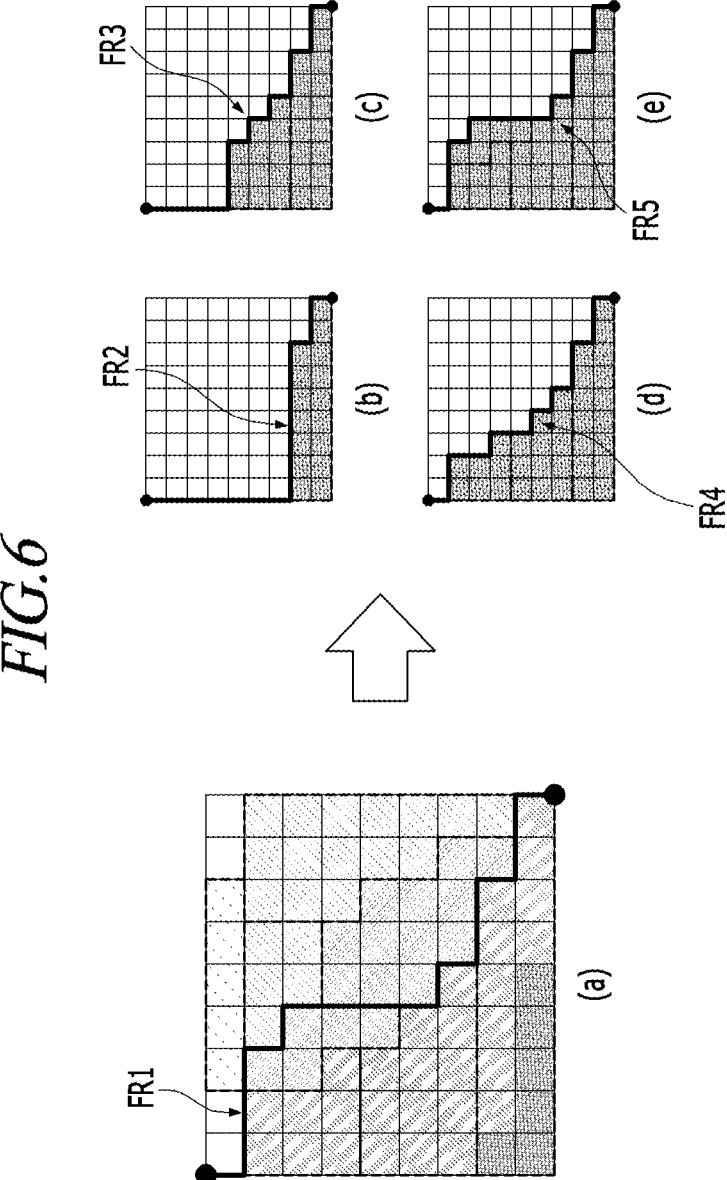
FIG. 6 illustrates how the arithmetic unit calculates a plurality of objective moving paths through a post-process.

FIG. 6 illustrates how the arithmetic unit SV calculates a plurality of objective moving paths FR2, FR3, FR4, FR5 through a post-process. In the present disclosure, the post-process may refer to a process of calculating a plurality of post-processing loop variables by changing, among the plurality of loop variables changed through the iteration, the value of a loop variable smaller than the post-processing threshold to 0 or changing the value of a loop variable greater than or equal to the post-processing threshold to the value of the reference path variable. Moreover, the arithmetic unit SV may be configured to compute the plurality of objective moving paths FR2, FR3, FR4, FR5 by changing the post-processing threshold. In FIG. 6, the shade of an area corresponding to a post-processing loop variable may correspond to the value of said post-processing loop variable.

In the system RSS for computing an optimal path in accordance with an embodiment of the present disclosure, the arithmetic unit SV may be configured to calculate the plurality of post-processing loop variables by changing, among the plurality of loop variables changed through the iteration, a value of a loop variable smaller than a post-processing threshold to 0. The arithmetic unit SV may be configured to compute the plurality of objective moving paths FR2, FR3, FR4, FR5 using the plurality of post-processing loop variables.

In the system RSS for computing an optimal path in accordance with an embodiment of the present disclosure, the arithmetic unit SV may be configured to calculate the plurality of post-processing loop variables by changing, among the plurality of loop variables changed through the iteration, the value of a loop variable smaller than the post-processing threshold to 0 and changing the value of a loop variable greater than or equal to the post-processing threshold to the value of the reference path variable. The arithmetic unit SV may be configured to compute the plurality of objective moving paths using the plurality of post-processing loop variables.

Specifically, the figure indicated with (a) in FIG. 6 shows the shades of a plurality of areas corresponding, respectively, to the plurality of loop variables and the objective moving path FR1 before the arithmetic unit SV performs the post-processing. The figure depicted with (b) in FIG. 6 shows the shades of a plurality of areas corresponding, respectively, to the plurality of loop variables and the objective moving path FR2 computed as a result of the arithmetic unit SV performing the post-processing by setting the post-processing threshold to 0.74. The figure depicted with (c) in FIG. 6 shows the shades of a plurality of areas corresponding, respectively, to the plurality of loop variables and the objective moving path FR3 computed as a result of the arithmetic unit SV performing the post-processing by setting the post-processing threshold to 0.70. The figure depicted with (d) in FIG. 6 shows the shades of a plurality of areas corresponding, respectively, to the plurality of loop variables and the objective moving path FR4 computed as a result of the arithmetic unit SV performing the post-processing by setting the post-processing threshold to 0.63. The figure depicted with (e) in FIG. 6 shows the shades of a plurality of areas corresponding, respectively, to the plurality of loop variables and the objective moving path FR5 computed as a result of the arithmetic unit SV performing the post-processing by setting the post-processing threshold to 0.56. Referring to (a) to (e) in FIG. 6, it can be seen that changing the post-processing threshold may also vary the objective moving path. That is, the objective moving path may be swiftly calculated through the post-processing, without performing additional iterations.

In the system RSS for computing an optimal path in accordance with an embodiment of the present disclosure, the arithmetic unit SV may be configured to calculate the plurality of post-processing loop variables and the plurality of objective moving paths FR2-FR5 corresponding, respectively, to a plurality of post-processing thresholds.

In the present specification, the optimal path may refer to an objective moving path computed using the plurality of loop variables through the iteration and/or an objective moving path computed using the plurality of post-processing loop variables.

Figure 7:
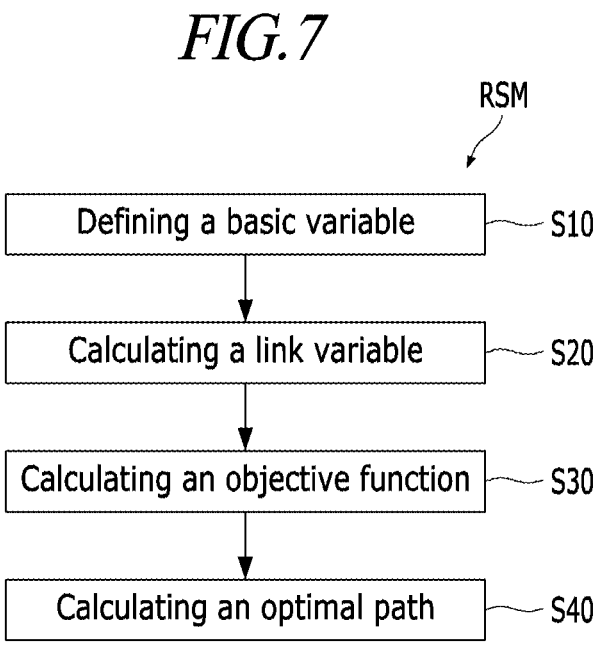
FIG. 7 is a flow diagram for a method for computing an optimal path in accordance with an embodiment of the present disclosure.
Figure 8:
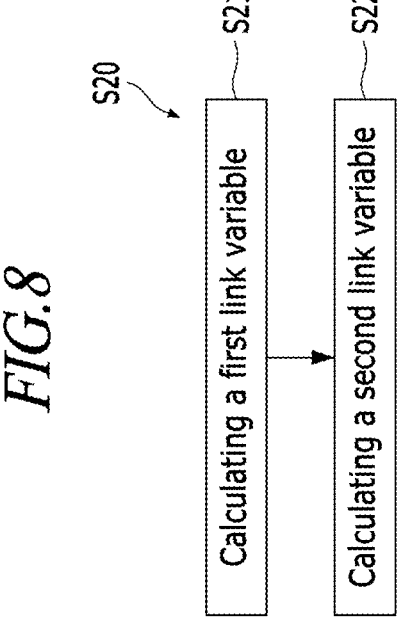
FIG. 8 is a flow diagram showing detailed steps of the step of calculating the link variable in accordance with an embodiment of the present disclosure.

FIG. 7 is a flow diagram for a method RSM for computing an optimal path in accordance with an embodiment of the present disclosure. FIG. 8 is a flow diagram showing detailed steps of the step of calculating the link variable (S20) in accordance with an embodiment of the present disclosure.

In the method RSM for computing an optimal path in accordance with an embodiment of the present disclosure, an arithmetic unit SV may be used. The arithmetic unit SV may be configured to compute an objective moving path FR from one of a plurality of nodes to another one of the plurality of nodes.

Referring to FIG. 7, the method RSM for computing an optimal path may include defining a basic variable (S10), calculating a link variable (S20), calculating an objective function (S30) and calculating an optimal path (S40).

In the step of defining a basic variable (S10), the arithmetic unit SV may define a plurality of link variables, each of which corresponds to a path connecting any two adjacent nodes of the plurality of nodes and having a value and a direction. Moreover, the arithmetic unit SV may define a plurality of loop variables, each of which corresponds to a closed path connecting any three nodes of the plurality of nodes and having a value and a direction. Furthermore, the arithmetic unit SV may define a reference path variable corresponding to any moving path and having a value and a direction.

In the step of calculating a link variable (S20), the arithmetic unit SV may calculate a plurality of link variables based on the reference link variable and the plurality of loop variables.

In the step of calculating an objective function (S30), the arithmetic unit SV may calculate a plurality of objective function values, each of which corresponds to a plurality of moving paths, using the plurality of link variables.

In the step of calculating an optimal path (S40), the arithmetic unit SV may calculate a moving path corresponding to a minimum objective function value, which is the smallest value among the plurality of objective function values, as the objective moving path.

In the method RSM for computing an optimal path in accordance with an embodiment of the present disclosure, the step of calculating a link variable (S20) may include calculating a first link variable (S21) and calculating a second link variable (S22).

In the step of calculating a first link variable (S21), the arithmetic unit SV may calculate a link variable median by adding a value of a first loop variable to a predetermined value when a direction of the first loop variable is the same as a direction of the first link variable and calculate the link variable median by subtracting the value of the first loop variable from the predetermined value when the direction of the first loop variable is different from the direction of the first link variable.

In the step of calculating a second link variable (S22), the arithmetic unit SV may calculate a value of the first link variable by adding the value of the reference path variable to the link variable median when the direction of the reference path variable is the same as the direction of the first link variable and calculate the value of the first link variable by subtracting the value of the reference path variable from the link variable median when the direction of the first loop variable is different from the direction of the first link variable. In the step of calculating an objective function (S30) in accordance with an embodiment of the present disclosure, the arithmetic unit SV defines a plurality of cost variables, each of which corresponds to a path connecting any two adjacent nodes of the plurality of nodes. Moreover, the arithmetic unit SV may further use the plurality of cost variables to calculate the plurality of objective function values.

In the step of calculating an objective function (S30) in accordance with an embodiment of the present disclosure, the arithmetic unit SV may compute the plurality of objective function values using Equation 1. Equation 1 may be $$\text{Minimize } f(X) = \sum_{i=1} \sum_{j=1} c_{i,j} x_{i,j},$$

whereas f(X) may correspond to any one of the plurality of objective function values, and i and j may each correspond to any one of the plurality of nodes, and $c_{i,j}$ may correspond to any one of the plurality of cost variables, and $x_{i,j}$ may correspond to any one of the plurality of link variables.

FIG. 9 is a flow diagram for a method RSM-1 for computing an optimal path in accordance with another embodiment of the present disclosure.

The method RSM-1 for computing an optimal path in accordance with an embodiment of the present disclosure may further include performing an iteration operation (S50). In the step of performing the iteration operation (S50), the arithmetic unit SV may perform at least one iteration in which at least some of the plurality of loop variables are changed such that the minimum objective function value is reduced.

In the step of performing the iteration operation (S50) of the method RSM-1 for computing an optimal path in accordance with an embodiment of the present disclosure, the arithmetic unit SV may determine whether to terminate the iteration based on a rate at which the minimum objective function value is reduced through the iteration or based on a value by which the minimum objective function value is reduced through the iteration.

Figure 10:
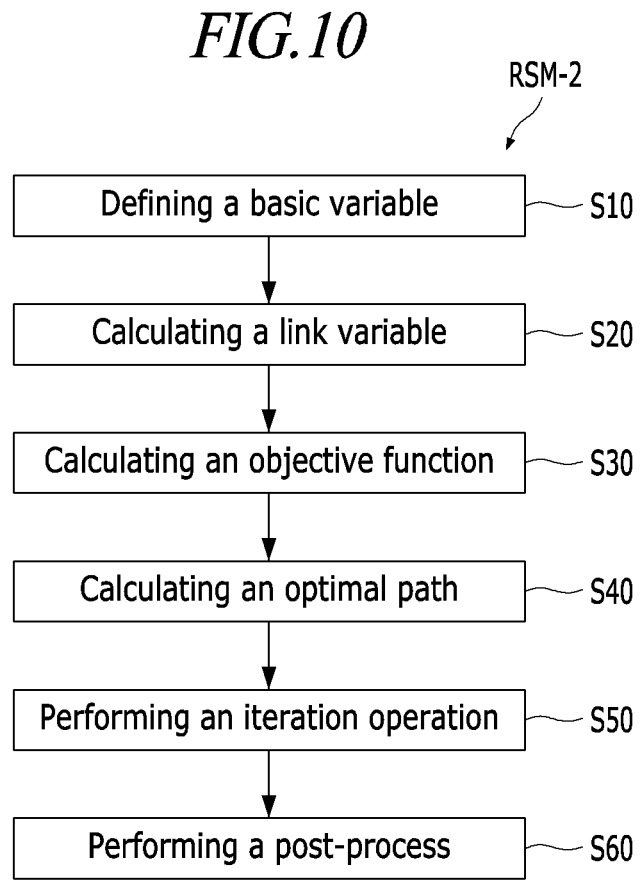
FIG. 10 is a flow diagram for a method for computing an optimal path in accordance with yet another embodiment of the present disclosure.

FIG. 10 is a flow diagram for a method RSM-2 for computing an optimal path in accordance with yet another embodiment of the present disclosure.

The method RSM-2 for computing an optimal path in accordance with an embodiment of the present disclosure may further include performing a post-process (S60). The arithmetic unit SV may compute a plurality of post-processing loop variables by changing, among the plurality of loop variables changed through the iteration, a value of a loop variable smaller than the post-processing threshold to 0.

In the step of performing a post-process (S60) of the method RSM-2 for computing an optimal path in accordance with an embodiment of the present disclosure, the arithmetic unit SV may compute a plurality of post-processing loop variables by changing, among the plurality of loop variables changed through the iteration, a value of a loop variable smaller than the post-processing threshold to 0 and changing a value of a loop variable greater than or equal to the post-processing threshold to the value of the reference path variable.

In the step of performing a post-process (S60) of the method RSM-2 for computing an optimal path in accordance with an embodiment of the present disclosure, the arithmetic unit SV may calculate a plurality of post-processing loop variables and a plurality of objective moving paths corresponding, respectively, to a plurality of post-processing thresholds.

Other features of the method RSM, RSM-1, RSM-2 for computing an optimal path in accordance with embodiments of the present disclosure are substantially identical to the features described with reference to FIG. 1 to FIG. 6 and thus will not be redundantly described.

FIG. 11 illustrates an objective moving path computed from point 1 PT1 to point 2 PT2 through the system RSS or method RSM for computing an optimal path in accordance with an embodiment of the present invention.

In the illustrated node map MP, the topography of Jeju Island, South Korea, is shown with a plurality of nodes and a plurality of lines connecting the plurality of nodes. The figure marked with (a) in FIG. 11 illustrates an objective moving path FR1 computed with a minimum moving distance. The figure marked with (b)) in FIG. 11 illustrates an objective moving path FR2 computed with a minimum energy consumption.

While certain embodiments of the present disclosure have been described above, anyone ordinarily skilled in the art to which the present disclosure pertains shall appreciate that there may be a variety of modifications and permutations of the present disclosure without departing from the technical ideas and scopes of the present disclosure that are defined in the appended claims. Moreover, it shall be appreciated that the disclosed embodiments are not intended to restrict the present disclosure thereto and that every technical idea within the appended claims and their equivalents is interpreted to be included in the scope of the present disclosure.

What is claimed is:

1. A system for computing an optimal path, comprising an arithmetic unit configured to compute an objective moving path from one of a plurality of nodes to another one of the plurality of nodes, wherein a plurality of link variables are defined, each of the plurality of link variables corresponding to a path connecting any two adjacent nodes of the plurality of nodes and having a value and a direction, wherein a plurality of loop variables are defined, each of the plurality of loop variables corresponding to a closed path connecting at least any three nodes of the plurality nodes and having a value and a direction, and wherein a reference path variable is defined, the reference path variable corresponding to any moving path and having a value and a direction, wherein the arithmetic unit is configured to compute the plurality of link variables based on the reference path variable and the plurality of loop variables, compute a plurality of objective function values corresponding, respectively, to a plurality of moving paths using the plurality link variables, and compute a moving path corresponding to a minimum objective function value, which is the smallest value among the plurality of objective function values, as the objective moving path.

2. The system for computing an optimal path as set forth in claim 1, wherein a first link variable of the plurality of link variables corresponds to a path connecting a first node and a second node of the plurality of nodes, and a first loop variable of the plurality of loop variables corresponds to a closed path connecting the first node, the second node and a third node of the plurality of nodes, and wherein the arithmetic unit is configured to compute a value of the first link variable based on a result of comparing the direction of the first link variable with the direction of the first loop variable and with the direction of the reference path variable.

3. The system for computing an optimal path as set forth in claim 2, wherein the arithmetic unit is configured to calculate a link variable median by adding the value of the first loop variable to a predetermined value when the direction of the first loop variable is the same as the direction of the first link variable and calculate the link variable median by subtracting the value of the first loop variable from the predetermined value when the direction of the first loop variable is different from the direction of the first link variable, and wherein the arithmetic unit is configured to calculate the value of the first link variable by adding the value of the reference path variable to the link variable median when the direction of the reference path variable is the same as the direction of the first link variable and calculate the value of the first link variable by subtracting the value of the reference path variable from the link variable median when the direction of the first loop variable is different from the direction of the first link variable.

4. The system for computing an optimal path as set forth in claim 3, wherein a plurality of cost variables are defined, each of the plurality of cost variables corresponding to a path connecting any two adjacent nodes of the plurality of nodes, and wherein the arithmetic unit is configured to further use the plurality of cost variables to calculate the plurality of objective function values.

5. The system for computing an optimal path as set forth in claim 3, wherein the arithmetic unit is configured to compute the plurality of objective function values using Equation 1, the Equation 1 being $$\text{Minimize } f(X) = \sum_{i=1}\sum_{j=1} c_{i,j} x_{i,j}, \qquad (1)$$

whereas f(X) corresponds to any one of the plurality of objective function values, i and j each corresponds to any one of the plurality of nodes, $c_{i,j}$ corresponds to any one of the plurality of cost variables, and $x_{i,j}$ corresponds to any one of the plurality of link variables.

18

6. The system for computing an optimal path as set forth in claim 3, wherein the arithmetic unit is configured to perform at least one iteration in which at least some of the plurality of loop variables are changed such that the minimum objective function value is reduced.

7. The system for computing an optimal path as set forth in claim 6, wherein the arithmetic unit is configured to change at least some of the plurality of loop variables using at least one of SQP (sequential quadratic programming), convex optimization, gradient-based methods, genetic algorithms, simulated annealing, interior-point methods and dynamic programming in the process of performing the iteration.

8. The system for computing an optimal path as set forth in claim 6, wherein the arithmetic unit is configured to perform the iteration multiple times, and wherein the arithmetic unit is configured to determine whether to terminate the iteration based on a rate at which the minimum objective function value is reduced through the iteration.

9. The system for computing an optimal path as set forth in claim 8, wherein the arithmetic unit is configured to terminate the iteration if the rate at which the minimum objective function value is reduced is less than a predetermined iteration threshold ratio.

10. The system for computing an optimal path as set forth in claim 6, wherein the arithmetic unit is configured to determine whether to terminate the iteration based on a value by which the minimum objective function value is reduced through the iteration.

11. The system for computing an optimal path as set forth in claim 6, wherein the arithmetic unit is configured to perform the iteration for a predetermined number of iterations.

12. The system for computing an optimal path as set forth in claim 6, wherein the arithmetic unit is configured to calculate a plurality of post-processing loop variables by changing, among the plurality of loop variables changed through the iteration, a value of a loop variable smaller than a post-processing threshold to 0 and compute a plurality of objective moving paths using the plurality of post-processing loop variables.

13. The system for computing an optimal path as set forth in claim 12, wherein the arithmetic unit is configured to calculate a plurality of post-processing loop variables and a plurality of objective moving paths corresponding, respectively, to a plurality of post-processing thresholds.

14. A method for computing an optimal path using an arithmetic unit configured to compute an objective moving path from one of a plurality of nodes to another one of the plurality of nodes, the method comprising:

defining a basic variable, in which the arithmetic unit defines a plurality of link variables, each of the plurality of link variables corresponding to a path connecting any two adjacent nodes of the plurality of nodes and having a value and a direction, defines a plurality of loop variables, each of the plurality of loop variables corresponding to a closed path connecting any three nodes of the plurality of nodes and having a value and a direction, and defines a reference path variable corresponding to any moving path and having a value and a direction;

calculating a link variable, in which the arithmetic unit calculates a plurality of link variables based on the reference link variable and the plurality of loop variables;

calculating an objective function, in which the arithmetic unit calculates a plurality of objective function values, each of the plurality of objective function values corresponding to a plurality of moving paths, using the plurality of link variables; and calculating an optimal path, in which the arithmetic unit calculates a moving path corresponding to a minimum objective function value, which is the smallest value among the plurality of objective function values, as the objective moving path.

15. The method for computing an optimal path as set forth in claim 14, wherein the step of calculating the link variable includes calculating a first link variable and calculating a second link variable, wherein, in the step of calculating the first link variable, the arithmetic unit calculates a link variable median by adding the value of a first loop variable to a predetermined value when the direction of the first loop variable is the same as the direction of the first link variable median and calculates the link variable median by subtracting the value of the first loop variable from the predetermined value when the direction of the first loop variable is different from the direction of the first link variable, and wherein, in the step of calculating the second link variable, the arithmetic unit calculates the value of the first link variable by adding the value of the reference path variable to the link variable median when the direction of the reference path variable is the same as the direction of the first link variable and calculates the value of the first link variable by subtracting the value of the reference path variable from the link variable median when the direction of the first loop variable is different from the direction of the first link variable.

16. The method for computing an optimal path as set forth in claim 14, wherein, in the step of calculating the objective function, the arithmetic unit defines a plurality of cost variables, each of the plurality of cost variables corresponding to a path connecting any two adjacent nodes of the plurality of nodes, and further uses the plurality of cost variables to calculate the plurality of objective function values.

17. The method for computing an optimal path as set forth in claim 14, wherein, in the step of calculating the objective function, the arithmetic unit calculates the plurality of objective function values using Equation 1, the Equation 1 being $$\text{Minimize } f(X) = \sum_{i=1} \sum_{j=1} c_{i,j} x_{i,j},$$

whereas f(X) corresponds to any one of the plurality of objective function values, i and j each corresponds to any one of the plurality of nodes, $c_{i,j}$ corresponds to any one of the plurality of cost variables, and $x_{i,j}$, corresponds to any one of the plurality of link variables.

18. The method for computing an optimal path as set forth in claim 17, further comprising performing an iteration operation, wherein, in the step of performing the iteration operation, the arithmetic unit performs at least one iteration in which at least some of the plurality of loop variables are changed such that the minimum objective function value is reduced.

19. The method for computing an optimal path as set forth in claim 18, wherein, in the step of performing the iteration operation, the arithmetic unit determines whether to terminate the iteration based on a rate at which the minimum objective function value is reduced through the iteration or based on a value by which the minimum objective function value is reduced through the iteration.

20. The method for computing an optimal path as set forth in claim 18, further comprising performing a post-process, wherein the arithmetic unit calculates a plurality of post-processing loop variables by changing, among the plurality of loop variables changed through the iteration, a value of a loop variable smaller than the post-processing threshold to 0.

* * * * *